United States Patent [19]
Jacobus, Jr.

[11] 4,084,204
[45] Apr. 11, 1978

[54] AUTOMATIC RECYCLE CIRCUIT

[75] Inventor: Nelson Mortimer Jacobus, Jr., Kensington, Md.

[73] Assignee: Communications Satellite Corporation, Washington, D.C.

[21] Appl. No.: 763,213

[22] Filed: Jan. 27, 1977

[51] Int. Cl.² ............................................. H02H 7/20
[52] U.S. Cl. ...................................... 361/72; 361/59; 361/110
[58] Field of Search .................... 361/59, 72, 73, 71, 361/110, 29, 28, 18, 196, 187, 93, 94; 323/8, 9

[56] References Cited

U.S. PATENT DOCUMENTS

| | | | |
|---|---|---|---|
| 3,317,791 | 5/1967 | Price et al. | 361/73 |
| 3,560,798 | 2/1971 | Tenebaum et al. | 361/73 |
| 3,609,456 | 9/1971 | Kayaguchi et al. | 361/29 |
| 3,878,436 | 4/1975 | Bogel | 361/72 |
| 3,944,889 | 3/1976 | Conway | 361/110 X |

Primary Examiner—Patrick R. Salce
Attorney, Agent, or Firm—Sughrue, Rothwell, Mion, Zinn and Macpeak

[57] ABSTRACT

An automatic recycle circuit is disclosed for use in a process or apparatus of the type wherein process or equipment conditions are monitored to detect an abnormal condition. The automatic recycle circuit accepts inputs from monitor circuits which are intended to cause recycle operation and monitor circuits which are intended to cause complete shutdown and reacts appropriately to each type of input. With respect to those inputs from monitor circuits which are intended to cause recycle action, the automatic recycle circuit is capable of permanently shutting down the process or apparatus if the detected abnormal condition has a duration exceeding a first predetermined time or abnormal conditions are detected a predetermined number of times within a second predetermined time period.

10 Claims, 1 Drawing Figure

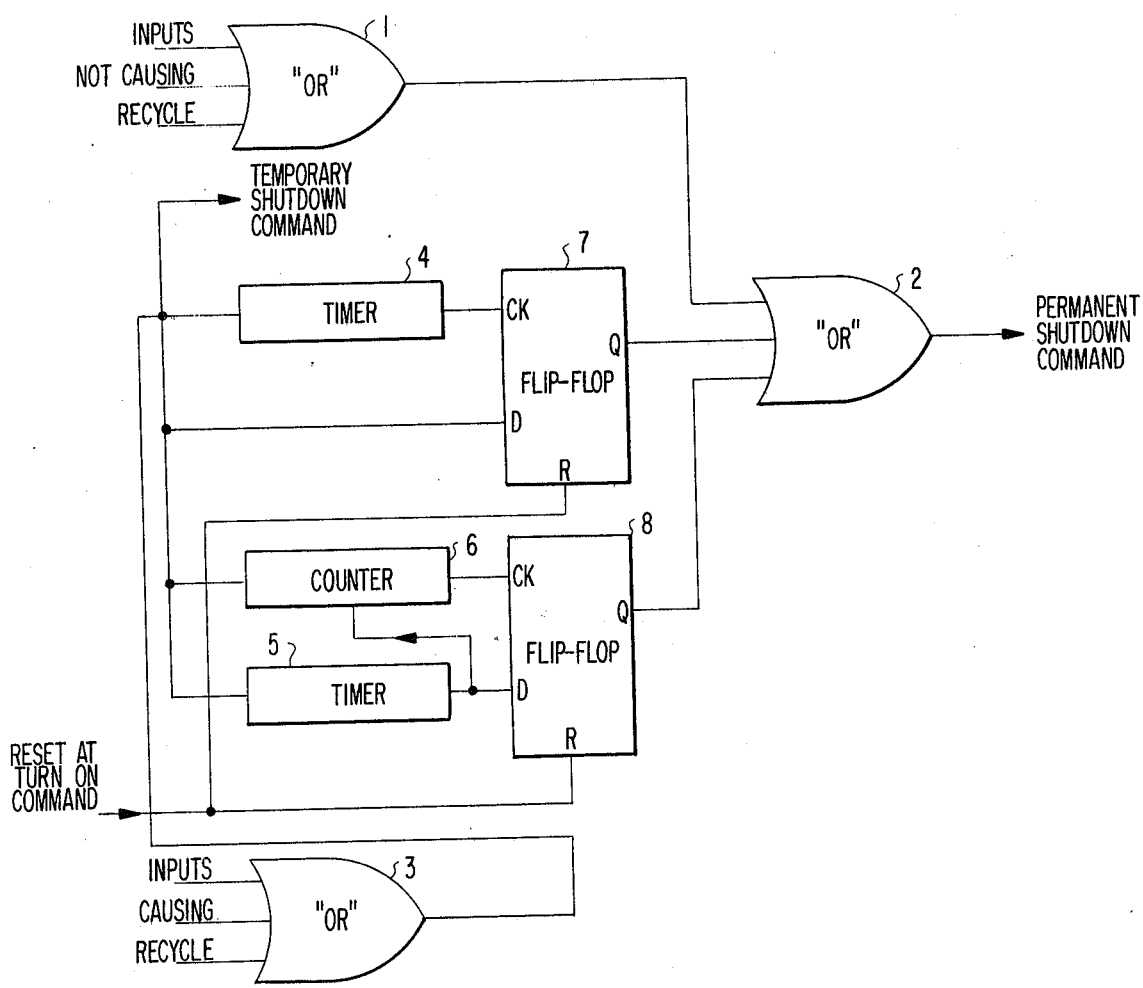

AUTOMATIC RECYCLE CIRCUIT

BACKGROUND OF THE INVENTION

The present invention generally relates to monitor and safety circuits, and more particularly to an automatic recycle circuit for use in a process or apparatus of the type wherein process or equipment conditions are monitored to detect an abnormal condition the detection of which causes a temporary shut-down followed by an automatic re-start of the process or apparatus, the automatic recycle circuit being capable of permanently shutting down the process or apparatus if the detected abnormal condition has a duration exceeding a first predetermined time period or abnormal conditions are detected a predetermined number of times within a second predetermined time period.

In many processes and apparatuses it is normal to find electronic or other equipment that is subjected to transitory, non-damaging excursions of operating conditions. If the equipment is protected by monitor circuits which detect operation beyond set limits and automatically actuate shutoff circuits, it is quite often possible that the equipment could be immediately returned to service without damage to the equipment and a minimum downtime. With monitor circuits that are well thought out, sensitive, and fast acting, many damaging failures and externally induced problems can be reduced to non-damaging transients. In the cases of communications equipment or devices related to the safety or control of a process, equipment turned off and kept off by automatic monitor circuits is, at the very least, an inconvenience.

Recycle action has historically been performed in several ways. An operator can be employed to notice that the unit has shut-down and then manually restore operation. This operation is slow, not reliable if the operator's attention is distracted, expensive in that an operator must be paid a continuous salary, and cannot be used at all with unattended equipment. Circuitry using mechanical timers and relays has been used to provide recycle action, but such circuitry and mechanical timers are large, heavy, costly and use considerable amounts of power. Moreover, a system of this type is generally incapable of modifying its actions to adjust to different circumstances of failure. Specifically, in the case where the equipment has been damaged resulting in either the detected abnormal condition being permanent or occurring repeatedly, the recycle circuitry causes the process or apparatus to oscillate between shut-down and start-up conditions. In those processes and apparatuses which are controlled by computers, there exist the capability to recycle and to modify the recycle actions to adjust for different circumstances of process or equipment failure; however, computers are generally limited to very large, complex and expensive systems.

SUMMARY OF THE INVENTION

It is therefore an object of this invention to provide an automatic recycle circuit which accepts inputs from monitor circuits which are intended to cause recycle action and monitor circuits which are intended to cause complete shut-down and react appropriately to each.

It is a more specific object of this invention to provide an automatic recycle circuit which is capable of permanently shutting down the process or apparatus being monitored if the detected abnormal condition has a duration exceeding a first predetermined time period or abnormal conditions are detected a predetermined number of times within a second predetermined time period.

It is a further object of this invention to provide such an automatic recycle circuit wherein the number of failures or recycle tries in a given time period and the length of that time period can be easily varied yet is simple in construction and inexpensive to manufacture.

The application which gave rise to the automatic recycle circuit according to the present invention is a power supply used in a communications system. Reduction of down time to a minimum is a necessity in the design of such a system. The output of the power supply for the system is subject to random malfunctions which, if detected and the power removed quickly enough, are not damaging. To minimize down time, the power supply must be turned back on as quickly as possible. In addition, the automatic recycle circuit must be capable of recognizing circumstances in which the failure is not transitory or that safety is being compromised. An important consideration of the particular equipment was that it be unattended and, therefore, must work completely automatically.

In the event of a failure or abnormal operating condition detected by monitors and/or interlocks, the automatic recycle circuit according to the present invention will either permanently shut down the operation to which it is connected or temporarily suspend that operation until the initiating monitor or interlock indicates the problem is no longer present, at which point the circuit will automatically try to restore normal operation. If the initiating monitor or interlock does not return to a normal condition within a preset time, the operation is permanently shut down. Should a problem, such as excessive current flowing in a short circuit, appear to be gone when the operation is suspended but return when the operation is re-energized, possibly producing an oscillatory condition between the shut down and the start-up, the circuit according to the invention counts the number of recycle tries or failures that occur within a period starting at the first failure and, if this count exceeds a preset number, initiates permanent shut-down. The period during which the number of recycle tries or failures is counted is not necessarily the same as the time period limiting the time required for the monitors or interlocks to return to normal.

BRIEF DESCRIPTION OF THE DRAWING

The foregoing and other objects, uses, aspects and advantages of the invention will clearly appear from the following description together with the accompanying drawing, in which the sole FIGURE is a block diagram of the preferred embodiment of the invention.

DESCRIPTION OF THE PREFERRED EMBODIMENT

All signals representing abnormal conditions for monitors or interlocks which are to cause a permanent shut-down of the process or apparatus without recycle action are connected to the input of OR gate 1. This may be an unlimited number of inputs, but in the case of a power supply for a communications system may be signals from the power supply door interlock, the high voltage cable interlock, and the transmitter amplifier door interlock indicating that these doors and/or cables are not properly closed or connected. Any signal indicating a failure or abnormal condition from one or more of the input circuits to the OR gate 1 will produce an output which is connected to one of the inputs of the OR gate 2 which initiates the command to permanently shut-down the process or apparatus being monitored.

All monitors or interlocks which are desired to initiate a recycle action are connected to the inputs of OR gate 3. Again, there may be an unlimited number of inputs to the OR gate 3, but in the power supply for a communications system, these inputs typically represent over voltage or over current, under voltage or under current, or similar abnormal conditions which are out-of-limit for the system being monitored. Any one of the input signals to the OR gate 3 indicating a malfunction or abnormal condition produces an output which simultaneouslsy is used to command a temporary shut-down of the process or apparatus being monitored, starts both of the timing devices 4 and 5 and increments the counter 6 one step. The timing devices 4 and 5 are preferably monostable multivibrators or one-shots and may have adjustable time periods.

The output of OR gate 3 is also connected to the data input D of a D-type of flip-flop 7. A D-type flip-flop is a bistable multivibrator which transfers information at the D input to the Q output on the leading edge of a clock pulse supplied to the clock input CK. In addition to the D and CK inputs, the D-type flip-flop has a reset or clear input R which is used to set the flip-flop in one of two stable states. The D-type flip-flop 7 may be a type SN 74174 device manufactured by Texas Instruments or the equivalent.

After a first predetermined time period, the one-shot 4 will produce a trigger pulse which is applied to the clock input CK of flip-flop 7. If the signal indicating a malfunction or abnormal condition has not been removed from the D input of flip-flop 7 when the one-shot 4 produces the trigger pulse, the flip-flop 7 is set to the other of its two stable states thereby producing an output signal at the output Q. This output signal is coupled to one of the inputs of the OR gate 2 to initiate a permanent shut-down of the process or apparatus being monitored.

During the time period of the output of the one-shot 5, there may be repeated or additional malfunctions or detected abnormal conditions. Each of these will increment the counter 6. If the counter 6 counts a predetermined number of recycles before the end of the period of the output of one-shot 5, the counter 6 produces a trigger pulse which is connected to the clock input CK of a second D-type flip-flop 8. The flip-flop 8 is initially set in one of two stable states by a pulse to the reset input R. Since the output of the one-shot 5 is connected to the D input of the flip-flop 8, a trigger pulse at the clock input CK causes the flip-flop 8 to be set to the other of its two stable states and produce an output signal at the output Q. The output Q of flip-flop 8 is also connected to one of the inputs of OR gate 2 and, as a result, an output signal from flip-flop 8 will cause a permanent shut-down command to be generated. If, on the other hand, a trigger pulse is not produced by the counter 6 within the time period of the output of the one-shot 5, the counter 6 is reset at the trailing edge of the output of the one-shot 5 to be ready for another malfunction sequence.

The period during which the number of recycles is counted may be variable. This can be accomplished by varying the value of the RC time constant of the one-shot 5. In like manner, the value of the timing capacitance of the one-shot can be varied to vary the period limiting the time required for the monitors or conditions to return to normal. In general, the period during which the number of recycle tries or failures is counted is not necessarily the same as the time period limiting the time for the monitors or interlocks to return to normal. For example, the timing period of one-shot 4 may be made to be the same order of magnitude as the recycle period for the process or apparatus being monitored. The timing period of one-shot 5 is typically greater than the recycle period and may be an order of magnitude or more greater than the recycle period.

Not only may the timing periods of one-shots 4 and 5 be varied, the counter 8 may be programmed in a well-known manner to produce an output trigger pulse for any desired count. Of course, if the counter 6 is replaced by a simple gating circuit, no such programming flexibility is afforded. The variation in timing periods and count may be determined at manufacture of the recycle circuit, or the circuit may be manufactured to permit adjustment of timing periods and count by an operator in the field.

In several places in the automatic recycle circuit illustrated in the drawing, the finite delays inherent in the actuation of the individual devices are necessary to ensure the proper time relationship of the inputs to the flip-flops 7 and 8. Most devices with which the circuit can be constructed will automatically have sufficient delays to produce the correct timing; however, those skilled in the art will recognize that some devices may be found which require the use of additional delays. Since devices for producing additional delays are readily available and the provision of the required delay is within the ordinary skill of the art, no further description will be given of the timing relationships.

After a permanent shut-down has been commanded by the recycle portion of the circuit, a reset pulse is required for which ever flip-flop caused the shut-down action in order to restart the process or apparatus. This pulse is applied to the R inputs of the flip-flops 7 and 8 and is normally obtained from the command used to restart the process or apparatus after the recycle circuit has permanently shut it down.

In a simplification of the circuit illustrated in the drawing, the counter 6 could be replaced by a gate circuit which is enabled by the output of the one-shot 5. The operation of the gate circuit would be such that it would produce a trigger pulse when a second malfunction or abnormal condition is detected within the time period of the output of the one-shot 5. Such a gate circuit could be a simple AND gate and an appropriate delay device, if required.

Having described the preferred embodiment of the automatic recycle circuit according to the invention, it will be apparent to those skilled in the art that the specific objects of the invention have been accomplished. The circuit will accept inputs from monitors or interlocks which are intended to either cause recycle action or those which are to cause permanent shut-down and treat each type of input appropriately. The circuit automaticaly overrides the recycle action and causes a permanent shut-down if abnormal recycle action is detected. The period of time that the circuit waits for a malfunction indication to return to normal before commanding permanent shut-down may be infinitely variable and can be arranged to be varied by an operator. The circuit allows any number of automatic restart cycles to occur before permanently shutting the operation down. The number of restart cycles can be counted during a specific time period, or a second restart cycle within the specific time period can simply be gated rather than counted. The number of cycles and the time period can be, within an infinite range, fixed at the time of design or made variable by an operator. The circuit automatically protects against the temporary shut-down condition continuing indefinitely if the monitor or interlock does not return to a normal state within a reasonable time. Equipment left in such a state is armed for turn-on without warning and might endanger or compromise other operating conditions made after the operation has been suspended for a prolonged period of time.

It will be appreciated by those skilled in the art that the automatic recycle circuit according to the present invention can be changed and modified without departing from the spirit of the invention as defined in the appended claims.

What is claimed is:

1. In a process or apparatus of the type wherein process or equipment conditions are monitored to detect an abnormal condition, the detection of which causes a temporary shut-down followed by an automatic restart of the process or apparatus, the improvement comprising an automatic recycle circuit capable of permanently shutting down the process or apparatus if the detected abnormal condition has a duration exceeding a first predetermined time period or abnormal conditions are detected a predetermined number of times within a second predetermined time period, said automatic recycle circuit comprising:
   first means for receiving signals representing detected abnormal conditions and generating a temporary shut-down command,
   first timing means responsive to said temporary shut-down command for comparing the duration of a detected abnormal condition with said first predetermined time period and generating a first output signal when said duration is greater than said first predetermined time period,
   second timing means responsive to said temporary shut-down command for counting the number of temporary shut-down commands generated by said first means within said second predetermined time period, said second timing means generating a second output signal when the number of detected temporary shut-down commands exceeds said predetermined number, and
   second means for receiving said first and second output signals from said first and second timing means, respectively, and generating a permanent shut-down command.

2. An automatic recycle circuit as recited in claim 1, wherein said second predetermined time exceeds said first predetermined time.

3. An automatic recycle circuit as recited in claim 1, wherein said first timing means comprises:
   a bistable device initially preset in one of two stable states, said temporary shut-down command enabling said bistable device to be set in the other of said two stable states, and
   a timing device responsive to said temporary shut-down command for generating a trigger pulse to said bistable device after said first predetermined time period, said bistable device being set in said other of said two stable states and generating said first output signal in response to said trigger pulse only when said bistable device is enabled by said temporary shut-down command.

4. An automatic recycle circuit as recited in claim 1, wherein said second timing means comprises:
   a timing device responsive to said temporary shut-down command for generating an output having a duration equal to said second predetermined time period,
   a bistable device initially preset in one of two stable states, the output of said timing device enabling said bistable device to be set in the other of said two stable states, and
   a counting device enabled by the output of said timing device and responsive to temporary shut-down commands for generating a trigger pulse to said bistable device if the number of detected temporary shut-down commands equals said predetermined number, said bistable device being set in the other of said two stable states and generating said second output signal in response to said trigger pulse only when said bistable device is enabled by the output of said timing device.

5. An automatic recycle circuit as recited in claim 4, wherein said counting device is a gate circuit.

6. An automatic recycle circuit as recited in claim 1, wherein said first and second timing means comprise:
   a first bistable device initially preset in one of two stable states, said temporary shut-down command enabling said first bistable device to be set in the other of said two stable states,
   a first timing device responsive to said temporary shut-down command for generating a trigger pulse to said first bistable device after said first predetermined time period, said first bistable device being set in the other of said two stable states and generating said first output signal in response to said trigger pulse only when said first bistable device is enabled by said temporary shut-down command,
   a second timing device responsive to said temporary shut-down comman for generating an output having a duration equal to said second predetermined time period,
   a second bistable device initially preset in one of two stable states, the output of said second timing device enabling said second bistable device to be set in the other of said two stable states, and
   a counting device enabled by the output of said second timing device and responsive to temporary shut-down commands for generating a trigger pulse to said second bistable device if the number of detected temporary shut-down commands equal said predetermined number, said second bistable device being set in said other of said two stable states and generating said second output signal in response to said trigger pulse only when said second bistable device is enabled by the output of said second timing device.

7. An automatic recycle circuit as recited in claim 6, wherein said first and second bistable devices are D-type flip-flops having data inputs for enabling said flip-flops and clock inputs for triggering said flip-flops.

8. An automatic recycle circuit as recited in claim 6, further comprising reset means for presetting said first and second bistable devices in said one of said two stable states.

9. An automatic recycle circuit as recited in claim 7, wherein said first and second timing devices are one-shots and the timing period of the second one-shot is greater than the timing period of the first one-shot.

10. An automatic recycle circuit as recited in claim 1, further comprising third means for receiving signals representing detected abnormal conditions, the detection of which causes a permanent shut-down of the process or apparatus, said third means having its output connected to the input of said second means.

* * * * *